(12) United States Patent
Nishimura et al.

(10) Patent No.: US 8,149,203 B2
(45) Date of Patent: Apr. 3, 2012

(54) SYSTEMS AND METHOD FOR DISPLAYING IMAGES WITH REDUCED POWER CONSUMPTION

(75) Inventors: Ken A. Nishimura, Fremont, CA (US); Ian Hardcastle, Sunnyval, CA (US); Pierre Mertz, Sunnyvale, CA (US); Rene Helbing, Palo Alto, CA (US); Charels W. Hoke, Menlo Park, CA (US); Barry Bronson, Saratoga, CA (US)

(73) Assignee: Wistron Corporation, Xizhi Dist., New Taipei (TW)

( * ) Notice: Subject to any disclaimer, the term of this patent is extended or adjusted under 35 U.S.C. 154(b) by 1156 days.

(21) Appl. No.: 11/853,651

(22) Filed: Sep. 11, 2007

(65) Prior Publication Data

US 2008/0042960 A1    Feb. 21, 2008

Related U.S. Application Data

(62) Division of application No. 10/402,071, filed on Mar. 26, 2003, now Pat. No. 7,283,114.

(51) Int. Cl.
*G09G 3/36* (2006.01)
(52) U.S. Cl. .......................................................... 345/97
(58) Field of Classification Search .................. None
See application file for complete search history.

(56) References Cited

U.S. PATENT DOCUMENTS

| | | | |
|---|---|---|---|
| 4,466,702 A | 8/1984 | Wiener-Avnear et al. | |
| 5,447,655 A | 9/1995 | Sato et al. | |
| 5,920,301 A | 7/1999 | Sakamoto et al. | |
| 5,963,186 A * | 10/1999 | Hughes et al. | 345/94 |
| 6,088,068 A * | 7/2000 | Halttunen et al. | 349/12 |
| 6,198,225 B1 | 3/2001 | Kano et al. | |
| 2002/0030649 A1 * | 3/2002 | Zavracky et al. | 345/87 |

* cited by examiner

*Primary Examiner* — Tammy Pham
(74) *Attorney, Agent, or Firm* — Winston Hsu; Scott Margo

(57) ABSTRACT

A method and a system for displaying images are provided. In the method, a pixel is provided that includes a layer of ferroelectric material and a layer of liquid crystal material. A first electric field is momentarily applied to the pixel to electrically polarize the ferroelectric layer to a first polarization. The first polarization is then used to maintain the liquid crystal material in a first orientation corresponding to a first apparent brightness of the pixel.

10 Claims, 6 Drawing Sheets

SYSTEMS AND METHOD FOR DISPLAYING IMAGES WITH REDUCED POWER CONSUMPTION

CROSS-REFERENCE TO RELATED APPLICATIONS

This is a divisional application of application Ser. No. 10/402,071, filed on Mar. 26, 2003, now U.S. Pat. No. 7,283,114, the entire disclosure of which is incorporated herein by reference.

BACKGROUND OF THE INVENTION

Power consumption is one of the factors that influences display technology. Reducing power consumption of a display makes the display more suitable for use in portable devices that use batteries to provide the power needed to operate the display. One type of display that is particularly suited for portable use is based on what is known in the alit as a microdisplay. An exemplary embodiment of a microdisplay has a rectangular array of 1,024×768 pixels and the silicon die on which the pixels are located is about 13 mm×10 mm in area. The individual pixels are approximately 12 µm square.

A typical display that incorporates a microdisplay works by passing non-polarized light from an electrically-powered light source through a polarizer. The polarizer converts the non-polarized light into plane-polarized light. The polarized light illuminates the microdisplay. Each pixel of the microdisplay reflects the polarized light with the polarization of the light either rotated or not, depending on the state of an electrical signal fed to the pixel. The microdisplay reflects the light back through the polarizer, which acts as an analyzer. The analyzer causes the pixels to appear bright or dark depending on whether or not the pixel rotated the polarization of the light. The bright and dark pixels collective form a black-and-white image that can be seen by looking at the microdisplay through the analyzer using an eyepiece. Some microdisplays are capable of displaying a grey scale. Each pixel of such a microdisplay can appear bright, dark or one or more brightness levels intermediate between bright and dark. The brightness of such a pixel depends on an electrical signal fed to the pixel. Other microdisplays are capable of displaying color images.

Applications for microdisplays continue to expand. For example, displays used as the viewfinder of digital cameras and digital camcorders can be based on a microdisplay. In another example, two displays each composed of a microdisplay and associated optics are fixed to a frame, similar to an eyeglass frame, to form an eyeglass display. An eyeglass display provides the user with a private, virtual image of a virtual computer screen or video screen.

Since displays incorporating microdisplays are small enough to be portable, batteries are often used to power the microdisplay, including power for the circuits of the microdisplay and power for the light source that illuminates the microdisplay. To minimize battery weight and maximize battery life, the power consumption of the microdisplay must be minimized.

Thus, what is needed is a microdisplay having a significantly lower power consumption than a conventional microdisplay.

SUMMARY OF THE INVENTION

The invention provides a method for displaying an image. In the method, a pixel is provided that includes a layer of ferroelectric material and a layer of liquid crystal material. A first electric field is momentarily applied to the pixel to electrically polarize the ferroelectric layer to a first polarization. The first polarization is then used to maintain the liquid crystal material in a first orientation corresponding to a first apparent brightness of the pixel.

The invention also provides a system for displaying an image. The system comprises pixels each of which includes a layer of ferroelectric material, a layer of liquid crystal material and a pixel drive circuit. The pixel drive circuit is operable to apply an electric field momentarily to the pixel to polarize the ferroelectric material to a first polarization. The first polarization maintains the liquid crystal material in a first orientation corresponding to a first brightness of pixel.

The method and system reduce power consumption in the pixel by maintaining the liquid crystal material in the first orientation by means of the polarization of the ferroelectric material instead of by means of the pixel drive circuit. The pixel drive circuit can operate only occasionally and spends the rest of the time in an idle state in which its power consumption is substantially reduced.

The invention finally provides a microdisplay-based display illuminated by ambient light. The display comprises a microdisplay, an optical waveguide and a polarizing beamsplitter. The microdisplay includes pixels each comprising a layer of ferroelectric material and a layer of liquid crystal material. The optical waveguide includes a light-receiving side surface, a light-transmissive first front end surface, a back end surface and a reflective device at the back end surface. The optical waveguide includes a light-responsive dye embedded therein. The light-responsive dye absorbs the ambient light received through the light-receiving side surface and, in response thereto, emits illumination light. The optical waveguide guides the illumination light towards the light-transmissive front end surface. The polarizing beamsplitter is located to receive the illumination light from the light-transmissive front end surface of the optical waveguide and to direct a polarization component of the illumination light towards the microdisplay.

By employing light derived from ambient light to illuminate the microdisplay, the power consumption of the display is further reduced.

DETAILED DESCRIPTION OF THE INVENTION

Systems and a method based on microdisplays for displaying images will be described. In some embodiments, a display incorporating a microdisplay is built into a portable apparatus that typically uses batteries for providing power. The systems and method for displaying images, such as the embodiments described here, can reduce the power consumption of display, thereby prolonging battery life.

In a microdisplay, power is mainly consumed by the pixel drive circuits and the electrically-powered light source. In conventional microdisplays, the pixel drive circuits operate at a high clock speed, and refresh the drive signal provided to each pixel at a rate of several tens of Hertz. Operating the pixel drive circuits in the manner just described consumes substantial power. However, it is unnecessary to operate the pixel drive circuits in the manner just described in applications that do not display a moving picture. Power consumption can be reduced by operating the pixel drive circuits in a pseudo-static mode in which the pixel drive circuits operate as infrequently as when the information to be displayed changes. The information to be displayed changes relatively slowly in non-moving picture applications such as still camera viewfinders, book readers and other types of data readers. Conventional microdisplays would typically have an unacceptably low contrast if their pixel drive circuits were operated in a pseudo-static mode.

Figure 1:
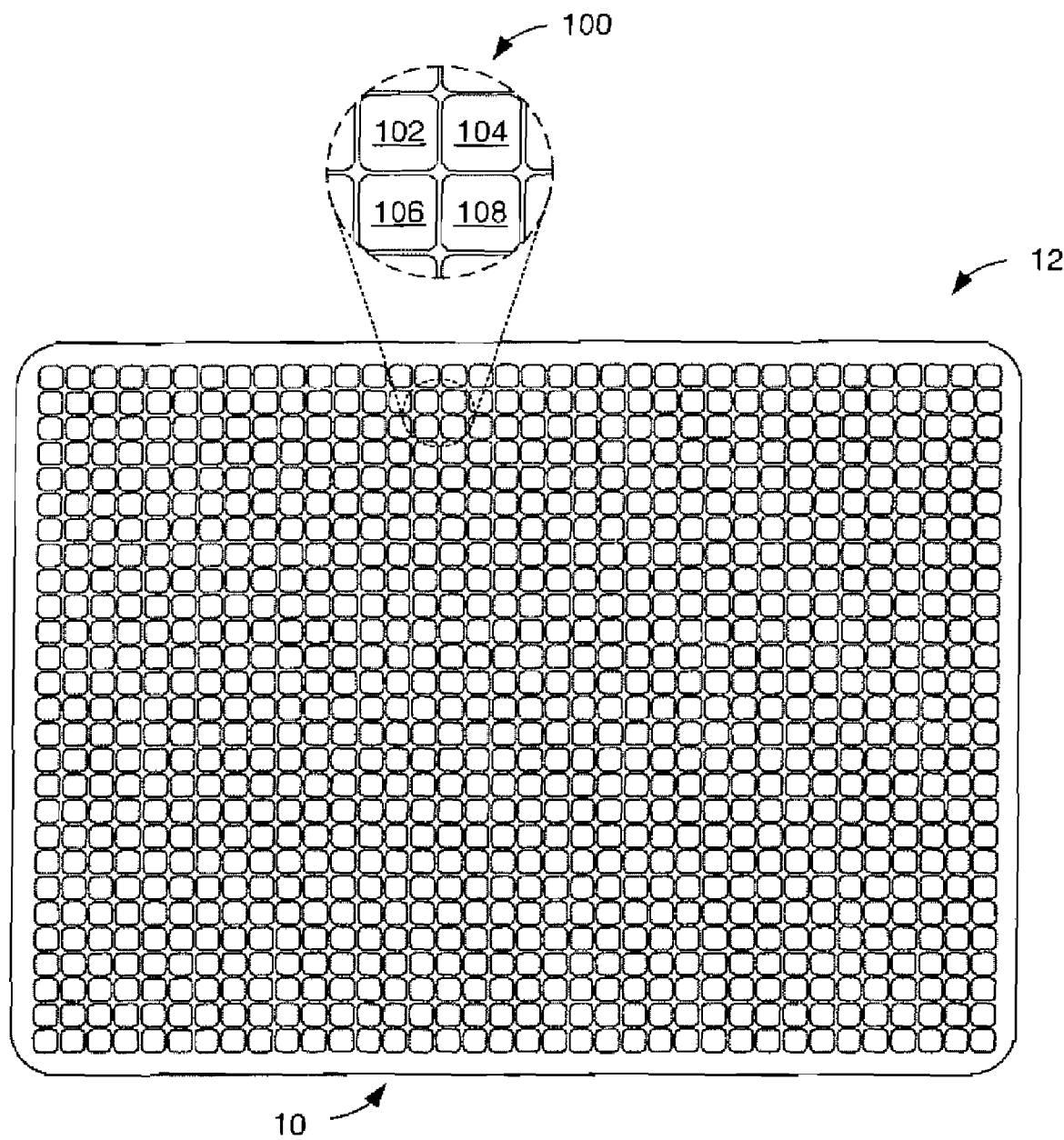
FIG. 1 is a schematic front view of an embodiment of a microdisplay, showing several exemplary pixels of the display.

Referring now to the drawings, FIG. 1 is a schematic front view of an embodiment of a microdisplay. In particular, FIG. 1 depicts a microdisplay 10 that includes an array 12 of picture elements or "pixels." An exemplary group 100 of pixels, i.e., pixels 102, 104, 106 and 108, is shown enlarged in an upper portion of FIG. 1.

Figure 2:
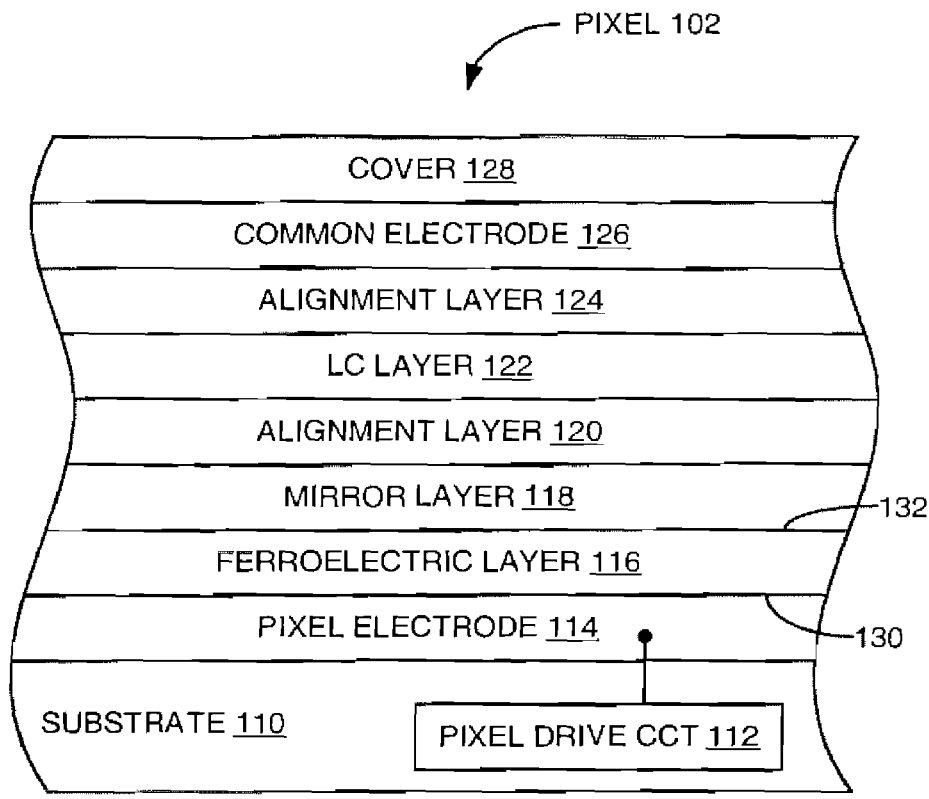
FIG. 2 is a schematic side view of a first embodiment of one of the pixels shown in FIG. 1.

FIG. 2 is a schematic side view of a first embodiment of pixel 102 of FIG. 1. Pixel 102 is merely an example: the remaining pixels of microdisplay 10 may be similarly structured. Pixel 102 is supported by a substrate 110. A pixel electrode 114 is located on the major surface of substrate 110. Pixel drive circuit 112 is fabricated in and on substrate 110 and has an output electrically connected to pixel electrode 114. Pixel 102 also includes a ferroelectric layer 116 located between electrode 114 and a common electrode 126. Ferroelectric layer 116 is a layer of a electrode material such as lead zirconium titanate (PZT). Other suitable ferroelectric materials are known in the art.

Between ferroelectric layer 116 and common electrode 126, pixel 102 additionally includes, in order from ferroelectric layer 116, a mirror layer 118, an alignment layer 120, an LC layer 122 and an alignment layer 124. Pixel 102 additionally includes a cover 128 located atop common electrode 126. Typically, cover 128, common electrode 126, alignment layer 124, LC material 122, alignment layer 120, mirror layer 118 and ferroelectric layer 116 are common to all pixels of microdisplay 10 and pixel electrode 114 belongs exclusively to pixel 102.

Mirror layer 118 comprises a dielectric mirror, for example. The mirror layer may alternatively comprise a conductive reflective material, such as aluminum. In this case, the mirror layer is divided into regions corresponding to the pixels.

At least one of alignment layer 120 and alignment layer 124 has a textured pattern formed in its major surface in contact with the LC material of LC layer 122. The LC material closest to the major surface aligns with the textured pattern.

Common electrode 126 and cover 128 are both optically transparent. Common electrode 126 is typically held at a constant DC potential, such as ground. Alternatively, a fixed-amplitude AC signal may be supplied to common electrode 126 to provide DC balancing of LC layer 122.

A voltage difference applied between pixel electrode 114 and common electrode 126 by pixel drive circuit 112 creates an electric field between the electrodes. Applying an electric field having a field strength greater than a threshold field strength to a ferroelectric material electrically polarizes the ferroelectric material. The ferroelectric material has a hysteresis characteristic similar to the B-H curve of a ferromagnetic material such as hard iron. Consequently, the ferroelectric material retains part of the electrical polarization even after application of the electric field is discontinued.

In the electrically-polarized state of ferroelectric layer 116, surface 132 remote from electrode 114 is at a electrical potential different from that of the surface 130 in contact with electrode 114. The potential of surface 130 is defined by the potential of pixel electrode 114 to which surface 130 is electrically connected. As will be described below, the difference in electrical potential between common electrode 126 and surface 132 due to the electrical polarization of the ferroelectric layer 116 applies a "permanent" electric field across LC layer 122. This electric field can set and/or maintain the orientation of the liquid crystal (LC) material of LC layer 122. The electric field is "permanent" in the sense that it remains after the electric field provided by electrodes 114 and 126 has been discontinued.

In operation, pixel 102 is illuminated with plane-polarized light. Initially, electrodes 114 and 126 apply no electric field across ferroelectric layer 116 and LC layer 122. With no applied electric field, the orientation of the LC material of LC layer 122 is such that the polarized light reflected by mirror layer 118 exits pixel 102 with its original optical polarization. When this light is viewed through an appropriately-aligned analyzer, pixel 102 appears bright.

Later, pixel drive circuit 112 and electrodes 114 and 126 apply a first electric field, i.e., an electric field having a first direction and a first magnitude, across ferroelectric layer 116 and LC layer 122. Application of the first electric field electrically polarizes the ferroelectric material of ferroelectric layer 116 to a first polarization and additionally changes the orientation of the LC material in LC layer 122. The changed orientation of the LC material alters the optical polarization of the polarized light, and the polarized light reflected by mirror layer 118 exits pixel 102 with its optical polarization rotated through 90 degrees. When this light is viewed through the analyzer, the pixel appears dark. Thus, pixel 102 appears dark or bright depending on whether or not the first electric field has been applied to it.

The presence of ferroelectric layer 116 in pixel 102 allows application of the first electric field to be discontinued after the first electric field has electrically polarized the ferroelectric layer to the first polarization. In fact, the pixel drive circuit 112 need only apply the drive signal to pixel electrode 114 for a time longer than the polarization response time of the ferroelectric material. Such an application time is characterized herein as momentary.

After it has momentarily applied the drive signal to pixel electrode 114, pixel drive circuit 112 sets the pixel electrode to a constant voltage at which the pixel drive circuit has low, e.g., minimum, power consumption. The constant voltage may be zero, for example. The voltage to which the pixel electrode is set defines the potential of surface 130 of ferroelectric layer 116 and, hence, the potential difference between common electrode 126 and the surface 132 of ferroelectric layer 116. The potential difference between common electrode 126 and surface 132 continues to apply an electric field to LC material 122. The electric field maintains the LC material in LC layer 122 in the orientation established by the first electric field. As a result, the apparent brightness of the pixel established by the first electric field is maintained by the polarization of the ferroelectric layer even after application of the first electric field has been discontinued.

The polarization response time of the ferroelectric material of ferroelectric layer 116 is substantially shorter than the response time of the LC material of LC layer 122. In embodiments in which the first electric field is applied for a time that is short compared with the response time of the LC material, such application of the first electric field negligibly changes the orientation of the LC material. In this case, the electric field applied to the LC material by the polarization of the ferroelectric material both sets the orientation of the LC material and maintains the LC material in the set orientation.

Some types of LC material that can be used in LC layer 122 change the optical polarization of the reflected light when no electric field is applied to it, and leave the optical polarization unchanged when an electric field is applied. With such LC material, the operation of pixel 102 is the inverse of that stated above. As will be described below, a different polarizer structure will also invert the operational sense of the pixel.

To alter the apparent brightness of pixel 102, pixel drive circuit 112 is operated again to apply a second electric field having a second direction and second magnitude across the ferroelectric layer 116 and LC layer 122. The second electric field electrically polarizes the ferroelectric layer 116 to a second polarization and additionally changes the orientation of the LC material of the LC layer to a second orientation. The second polarization is also "permanent" with the result that, at the end of the application of the second electric field, the second polarization maintains the second orientation of the LC material. In an embodiment, the second electric field reduces the electrical polarization of the ferroelectric layer to zero, i.e., the second polarization is zero in this example, the second orientation corresponds to the orientation with no applied electric field, and the pixel once again appears dark.

In embodiments in which the second electric field is applied for a time that is short compared with the response time of the LC material, such application of the second electric field negligibly changes the orientation of the LC material of LC layer 122. In this case, the electric field applied to the LC material by the second polarization of the ferroelectric material both sets the orientation of the LC material to the second orientation and maintains the LC material in the second orientation.

To reduce the electrical polarization of ferroelectric layer 116, the hysteresis characteristic of the ferroelectric material requires that second electric field be in the opposite direction to the first electric field. To apply electric fields having opposite directions, pixel drive circuit 112 has to be capable of generating both positive and negative output voltages. Alternatively, pixel drive circuit 112 may be configured with differential outputs and common electrode 126 may be divided into regions corresponding to the pixels. In this case, pixel electrode 114 is connected to one of the differential outputs and the region of common electrode 126 corresponding to pixel 102 is connected to the other of the differential outputs. This allows electrodes 114 and 126 to apply electric fields to polarization layer 116 in both directions.

Electrodes 114 and 126 apply the first electric field across both ferroelectric layer 116 and LC layer 122. Consequently, part of the first electric field is applied across the ferroelectric layer and the remainder of the first electric layer is applied across the LC layer. Application of part of the first electric field to the LC layer changes the orientation of the LC material of the LC layer. In embodiments in which the electrodes apply the first electric field for a time comparable with or greater than the response time of the liquid crystal material of LC layer 122, pixel 102 is structured so that the orientation of the LC material when the first electric field is applied approximates the orientation of the LC material when only the electric field resulting from the first polarization is applied to the LC layer. This reduces display flicker by preventing the apparent brightness of the pixel from changing substantially when application of the first electric field is discontinued and orientation of the LC material is maintained by the electrical polarization of the ferroelectric layer.

The orientation of some classes of LC material depends on the direction as well as the magnitude of the electric field. In pixel 102, the electric field applied by polarization layer 116 and common electrode 126 to LC layer 122 is opposite in direction to the first electric field applied by electrodes 114 and 126. The first electric field should therefore be applied to such classes of LC material for a time that is short compared with the response time of the LC material so that the orientation of the LC material is defined only by the electric field applied by the polarization layer 116 and common electrode 126.

Figure 3:
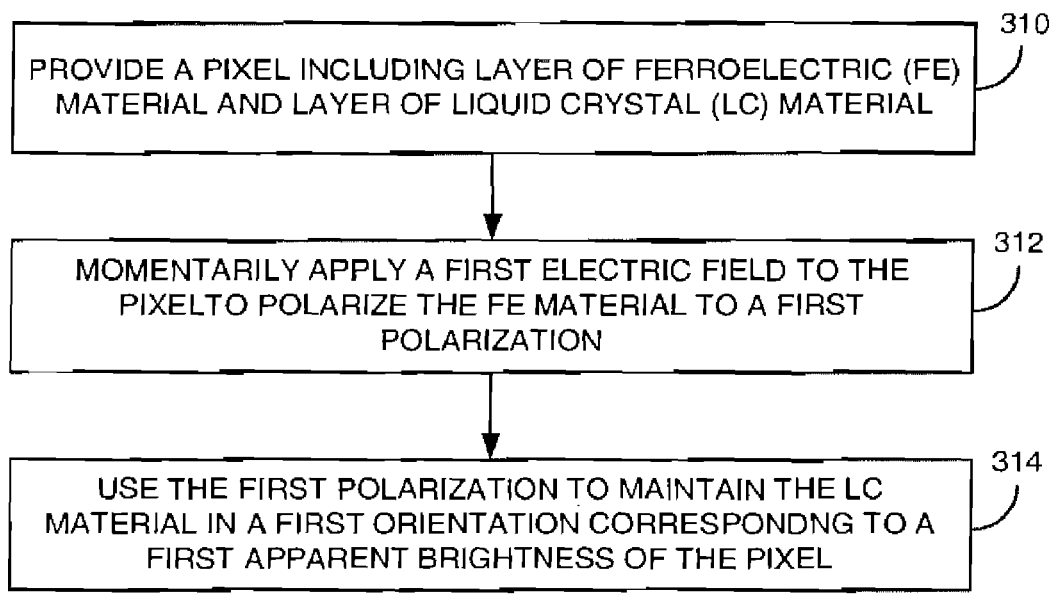
FIG. 3 is a flowchart of a first embodiment of a method for displaying images.

A method for displaying images will now be described with reference to the flowchart of FIG. 3. The method may be performed by a pixel such as that just described above with reference to FIG. 2. The method begins at block 310, where a pixel including a layer of ferroelectric material and a layer of liquid crystal material is provided. In block 312, a first electric field is momentarily applied to the pixel to electrically polarize the ferroelectric layer to a first polarization. In block 314, the first polarization of the ferroelectric layer is used to maintain the liquid crystal material in a first orientation. The first orientation defines a first apparent brightness of the pixel.

The method may additionally comprise a block in which a second electric field is momentarily applied to the pixel to alter the electrical polarization of the ferroelectric layer to a second polarization. The second polarization maintains the liquid crystal material in a second orientation that corresponds to a second apparent brightness of the pixel. The second apparent brightness is different from the first apparent brightness. For example, the liquid crystal material in its second orientation does not rotate the optical polarization of the polarized light so that the second apparent brightness corresponds to a bright pixel.

The method may additionally comprise using the first polarization to set the liquid crystal material to the first orientation.

Figure 4:
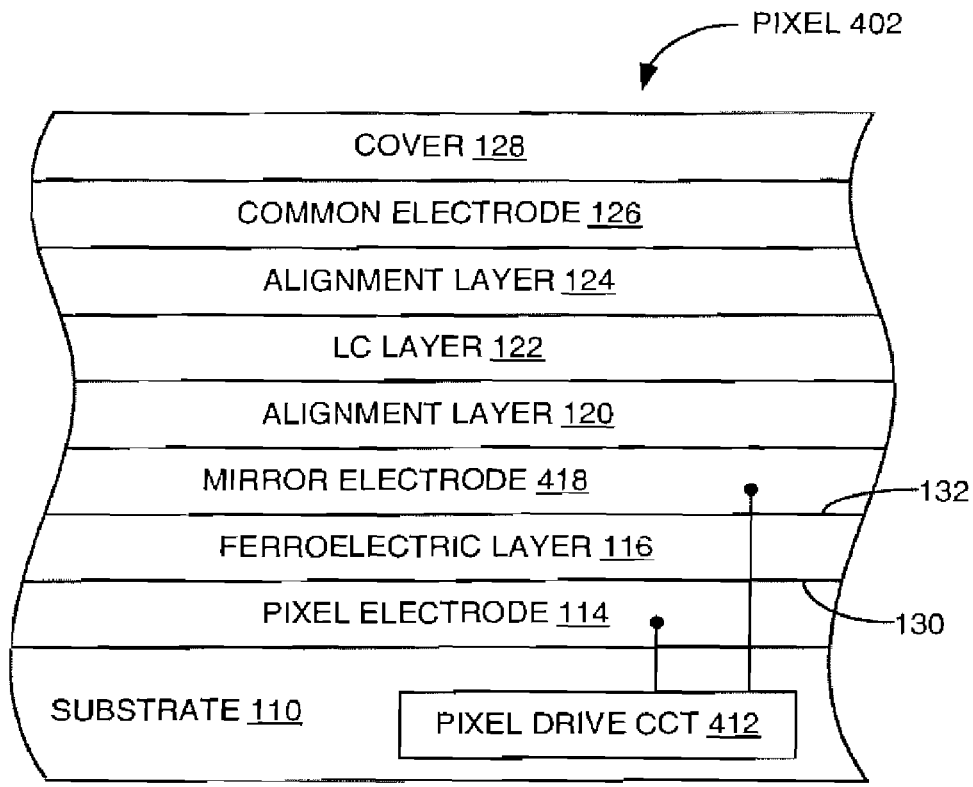
FIG. 4 is a schematic side view of a second embodiment of a pixel.

FIG. 4 is a schematic side view of a second embodiment 402 of a pixel that has reduced power consumption compared with a conventional pixel in which the pixel drive circuit constantly applies a drive signal to the LC material. Elements of pixel 402 that correspond to elements of pixel 102 described above with reference to FIG. 1 are indicated using the same reference numerals and will not be described again here.

Pixel 402 is supported by substrate 110. Pixel electrode 114 is located on the major surface of substrate 110. Pixel drive circuit 412 is fabricated in and on substrate 110 and has outputs electrically connected to pixel electrode 114 and mirror electrode 418. Mirror electrode 418 is part of a layer of a reflecting, electrically-conductive material such as aluminum.

Ferroelectric layer 116 is located between pixel electrode 114 and mirror electrode 418. A drive signal provided by pixel drive circuit 412 to pixel electrode 114 and mirror electrode 418 causes pixel electrode 114 and mirror electrode 418 to apply an electric field to ferroelectric layer 116.

Pixel 402 additionally includes, in order from mirror electrode 418, alignment layer 120, LC layer 122 of liquid crystal material, alignment layer 124 and common electrode 126. Pixel 402 additionally includes cover 128 located atop common electrode 126. Typically, cover 128, common electrode 126, alignment layer 124, LC layer 122, alignment layer 120 and ferroelectric layer 116 are common to all pixels of a display of which pixel 402 forms part, and pixel electrode 114 and mirror electrode 418 belong exclusively to pixel 402. Common electrode 126 is typically held at a constant DC potential, such as ground. Alternatively, a fixed-amplitude AC signal may be supplied to common electrode 126 to provide DC balancing of LC layer 122.

Pixel drive circuit 412 is configured to be capable of applying electric fields having opposite directions to ferroelectric layer 116. Pixel drive circuit 412 may be structured to be capable of applying both positive and negative output voltages to mirror electrode 418. In this case, pixel electrode 114 may made be common to all pixels of the microdisplay and connected to a constant DC voltage, such as ground. Alternatively, pixel drive circuit 412 may have differential outputs connected to pixel electrode 114 and mirror electrode 418.

In operation, pixel 402 is illuminated with plane-polarized light. Initially, electrodes 114 and 418 apply no electric field to ferroelectric layer 116, and no electric field exists across LC layer 122. With no electric field, the LC material of LC layer 122 has an orientation that causes the polarized light reflected by mirror electrode 418 to exit pixel 102 with its original optical polarization. When this light is viewed through an appropriately-aligned analyzer, pixel 402 appears bright.

Later, pixel drive circuit 412 establishes a voltage difference between pixel electrode 114 and mirror electrode 418. For example, the pixel drive circuit holds pixel electrode 114 at ground potential and applies a non-ground potential to mirror electrode 418. The voltage difference between the pixel electrode and the mirror electrode applies a first electric field, i.e., an electric field having a first direction and a first magnitude, to ferroelectric layer 116. The first electric field electrically polarizes the ferroelectric layer 116 to a first polarization. Since the first electric field is applied to ferroelectric layer 116 by electrodes 114 and 418 located immediately adjacent the ferroelectric layer, the drive voltage required to generate an electric field strength sufficient to polarize the ferroelectric layer is less than that which would be required to apply the same electric field strength with electrodes spaced apart from the ferroelectric layer, as in pixel 102 shown in FIG. 2.

The potential difference between mirror electrode 418 and common electrode 126 applies an electric field to liquid crystal layer 122. This electric field changes the orientation of the LC material of LC layer 122. The changed orientation of the LC material alters the optical polarization of the polarized light, and the polarized light reflected by mirror electrode 418 exits pixel 402 with its optical polarization rotated through 90 degrees. When this light is viewed through the analyzer, the pixel appears dark. Thus, pixel 402 appears dark or bright depending on whether or not the first electric field has been applied to it.

After a time sufficient to polarize ferroelectric layer 116, pixel drive circuit 412 discontinues its application of the electric field to the ferroelectric layer. To discontinue application of the electric field, the pixel drive circuit sets the voltage applied to pixel electrode 114 to a constant voltage at which the pixel drive circuit has low, e.g., minimum, power consumption. The constant voltage may be zero, for example. The pixel drive circuit additionally turns off active devices connected to mirror electrode 418, which allows the mirror electrode to float electrically. This prevents the mirror electrode from shielding LC layer 122 from ferroelectric layer 116.

The voltage to which pixel drive circuit 412 sets pixel electrode 114 defines the potential of surface 130 of ferroelectric layer 116 and, hence, the potential difference between common electrode 126 and the surface 132 of ferroelectric layer 116. The potential difference between common electrode 126 and the surface 132 of ferroelectric layer 116 applies a "permanent" electric field to LC layer 122. The electric field maintains the LC material in the LC layer in the orientation established by the electric field established between electrodes 418 and 126. The orientation of the LC material continues to alter the optical polarization of the polarized light, and the polarized light reflected by mirror electrode 418 exits pixel 402 with its optical polarization rotated through 90 degrees. When this light is viewed through the analyzer, pixel 402 appears dark.

As noted above, the polarization response time of the ferroelectric material of ferroelectric layer 116 is substantially shorter than the response time of the LC material of LC layer 122. In embodiments in which the first electric field is applied for a time that is short compared with the response time of the LC material, such application of the first electric field negligibly changes the orientation of the LC material. In this case, the electric field applied to the LC material by the polarization of the ferroelectric material both sets the orientation of the LC material and maintains the LC material in the set orientation.

To alter the apparent brightness of pixel 402, pixel drive circuit 412 is operated again to cause pixel electrode 114 and mirror electrode 418 to apply a second electric field that differs in magnitude and direction from the first electric field to ferroelectric layer 116 to change the polarization of the ferroelectric layer. The second electric field may additionally change the orientation of the LC material and the apparent brightness of the pixel. After application of the second electric field has been discontinued, the changed polarization of the ferroelectric layer maintains the changed orientation of the LC layer and, hence, the polarization of the light reflected by mirror electrode 418 and the apparent brightness of pixel 402.

In embodiments in which the second electric field is applied for a time that is short compared with the response time of the LC material, such application of the second electric field negligibly changes the orientation of the LC material of LC layer 122. In this case, the electric field applied to the LC material by the second polarization of the ferroelectric material both changes the orientation of the LC material to the second orientation and maintains the LC material in the second orientation.

Figure 5:
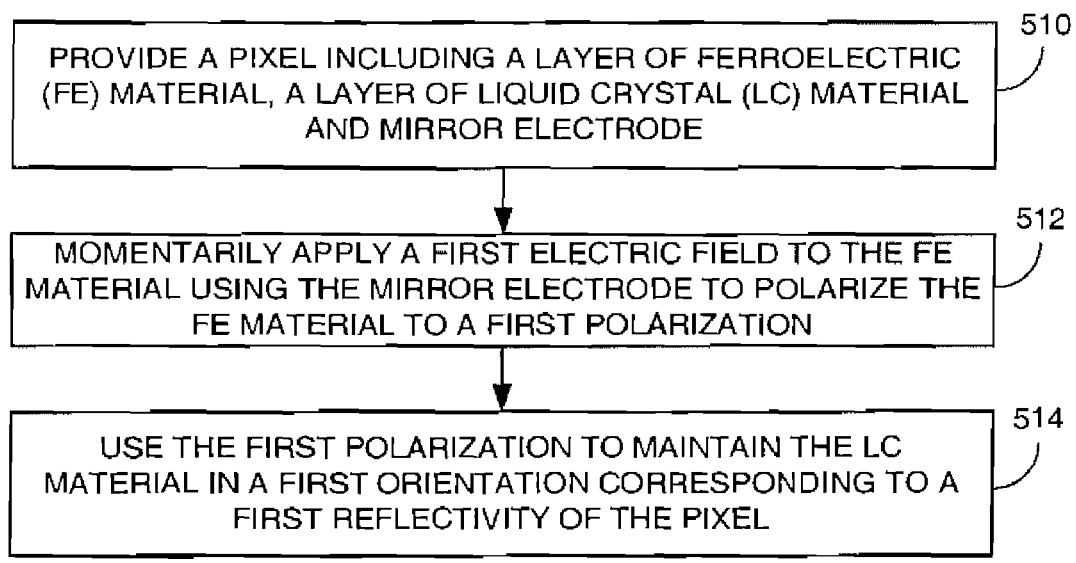
FIG. 5 is a flowchart of a second embodiment of a method for displaying images.

A method for displaying images will now be described with reference to the flowchart of FIG. 5. The method may be performed by a pixel such as that just described with reference to FIG. 4. The method begins at block 510, where a pixel including a layer of ferroelectric material, a mirror electrode and a layer of liquid crystal material is provided. In block 512, the mirror electrode is used to apply a first electric field to the ferroelectric layer to electrically polarize the ferroelectric layer with a first polarization. In block 514, the first polarization is used to maintain the liquid crystal material in a first orientation corresponding to a first apparent brightness of the pixel.

The method may additionally comprise a block in which an electric field different from the first electric field is applied by the mirror electrode to the ferroelectric layer to alter the electrical polarization of the ferroelectric layer to a second polarization. The second polarization maintains the liquid crystal material in a second orientation that corresponds to a second apparent brightness of the pixel. For example, the liquid crystal material in its second orientation does not rotate the optical polarization of the polarized light so that the second apparent brightness corresponds to a bright pixel.

The invention has been described above with reference to examples in which the pixel appears either dark or bright, depending on whether or not the pixel has rotated the polarization of the plane-polarized light. Such examples are ideal for use in applications such as book readers, etc. in which a black and white image is acceptable.

In other applications, pixels capable of displaying a grey scale are desirable. A grey scale can be provided by a pixel in which the electric fields applied to the LC material of LC layer 122 by the electrodes or by ferroelectric layer 116 and common electrode 126 can have levels intermediate between the level that leaves the orientation of the LC material unchanged and the level that changes the orientation of the LC material such that the optical polarization of the light reflected by the pixel is rotated through 90 degrees. In such pixels, the pixel drive circuit is capable of generating the pixel drive signal at levels defined by a grey-scale defining input signal.

Alternatively, a grey scale can be provided by dividing each pixel into a number of sub-pixels and setting each sub-pixel to appear bright or dark. To make the pixel appear fully dark, all of the sub-pixels of the pixel are set to appear dark. In contrast, to make the pixel appear fully bright, all of the sub-pixels of the pixel are set to appear bright. To make the pixel appear grey, i.e., part-way between dark and bright, some of the sub-pixels are set to appear bright and the remaining sub-pixels are set to appear dark.

To produce a color image, individual grey-scale capable pixels are equipped with a red, green or blue filter and are illuminated with white light or other light with red, green and blue components. The pixels are fed with a respective red, green or blue component of the image signal, as is known in the art.

The pixel structures described above reduce the power consumption of microdisplay 10 by allowing the pixel drive circuits 112 and 412 to operate as infrequently as when the information to be displayed changes. Between changes in the information to be displayed, the pixel drive circuits are set to an idle state in which their power consumption is substantially reduced. In each pixel, the pixel drive circuit in its idle state does not apply a drive signal to the pixel to maintain the orientation of the liquid crystal material. Instead, the orientation of the liquid crystal material is maintained by a "permanent" electric field supplied by the electrical polarization of the ferroelectric layer. The electrical polarization of the ferroelectric layer is established by the electric field generated by the drive signal momentarily provided by the pixel drive circuit.

Power consumption can be further reduced by using ambient light to illuminate the microdisplay. A suitable ambient light illumination system that collects and concentrates ambient light is described in U.S. Pat. No. 6,362,861, assigned to the assignee of this disclosure and incorporated herein by reference. Examples of the use of such an ambient light illumination system to illuminate microdisplay 10 will be described next.

Figure 6:
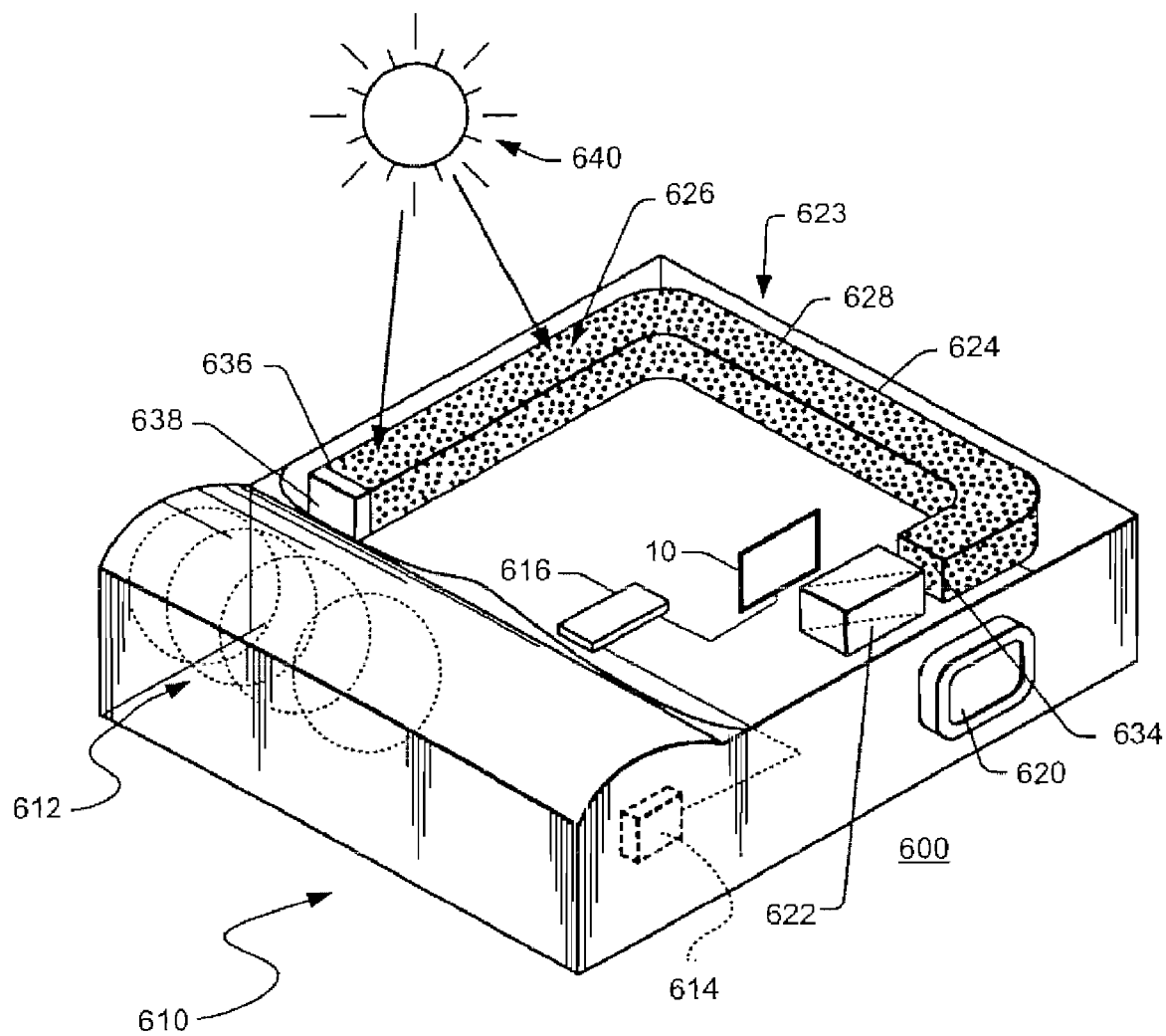
FIG. 6 is an isometric view of a camera incorporating an embodiment of a microdisplay-based display illuminated by ambient light.

FIG. 6 shows an embodiment of a microdisplay-based system 600 for displaying images. Display 600 is built into a digital still camera 610. Camera 610 includes optics 612 and an image sensor 614 such as a charge coupled device (CCD) or active CMOS sensor. Image sensor 614 sends a set of data representing an image to an image processing circuit 616. The image processing circuit processes the image data for storage in a storage medium (not shown) and can additionally retrieve stored image data from the storage medium for display. The image processing circuit generates an image signal from the image data and feeds the image signal to microdisplay 10. The microdisplay includes an array of pixels, each of which can be structured as shown in FIG. 2 or in FIG. 4, for example.

In generating the image signal, image processing circuit 616 takes account of the current polarization of the ferroelectric layer of each pixel and calculates a desired polarization that would set the brightness of the pixel to the desired brightness indicated by the image data for the pixel. The image processing circuit then calculates the magnitude and direction of the electric field required to change the current polarization of the ferroelectric layer of the pixel to the desired polarization, and generates a signal portion of the image signal for the pixel that represents the magnitude and direction of the electric field to be applied in the pixel.

Microdisplay 10 receives the image signal from image processing circuit 616, segments the image signal into signal portions corresponding to the pixels of the microdisplay and distributes the signal portions to the respective pixels. The signal portion received by each pixel defines the electric field that the electrodes of the pixel will apply to the ferroelectric layer in the pixel to achieve the desired polarization of the ferroelectric layer and, hence, the desired brightness of the pixel. The pixels collectively produce an image that matches the image formed on CCD 614 by optics 612.

Microdisplay 10 is illuminated by polarized light obtained by passing non-polarized illumination light through polarizing beam-splitter 622. One face of the beam splitter is illuminated by the non-polarized illumination light. The beam splitter reflects only one polarization component of the non-polarized illumination light towards microdisplay 10. The resulting plane-polarized light exits the beam splitter through a face orthogonal to the illuminated face. The microdisplay 10 reflects light back towards the beam splitter. The pixels of the microdisplay selectively rotate or do not rotate the polarization of the reflected light, as described above. The reflected light re-enters the beam splitter, which acts as an analyzer. Light whose polarization has been rotated passes through the beamsplitter to eyepiece 620. Light whose polarization has not been rotated is reflected by the beamsplitter away from the eyepiece. Thus, a pixel that has rotated the polarization of the incident light will appear bright when observed through the eyepiece whereas a pixel that has left the polarization of the incident light unchanged will appear dark. The beamsplitter therefore operates in the opposite sense to the polarizer/analyzer referred to above.

A user sees an image on microdisplay 10 through beamsplitter 622 and eyepiece 620. When viewed through the eyepiece 620, the bright and dark pixels form an image with the bright pixels having the color of the illumination light illuminating the beamsplitter.

The non-polarized illumination light is provided by ambient illuminator 623. The ambient illuminator is composed of a waveguide 624 having a core of an optical material such as glass or plastic surrounded by a cladding of a material having a refractive index less than that of the core. Air may be used as the cladding. Molecules of light-responsive dye, schematically indicated at 626 are embedded in the core. The light-responsive dye absorbs ambient light in a broad range of wavelengths and, in response to the absorbed light, emits illumination light in a narrower range of wavelengths. The waveguide has side surfaces 628, a light-transmissive front end surface 634, and a back end surface 636 equipped with a reflective device 638, such as layer of reflective material deposited on the back end surface.

In still camera 610, ambient light from ambient light source 640 is received through the side surfaces 628 of waveguide 624 and is absorbed at least in part by light-responsive dye 626. In response to the absorbed ambient light, the light-responsive die emits illumination light 644. The illumination light is internally reflected at the core-cladding boundary of waveguide 624 towards either light-transmissive front end surface 634 or back end surface 636. Illumination light that reaches back end surface 636 is reflected by reflective device 638 towards light-transmissive front end surface 634. The illumination light is output from the waveguide through the light-transmissive front end surface.

Since most of the illumination light 644 emitted by the light-responsive dye is trapped inside waveguide 624, the intensity of the illumination light output at light-transmissive front end surface 634 is sufficient to illuminate microdisplay 10. By capturing the ambient light via the large-area side surfaces and concentrating the ambient light using waveguide 624 and light-responsive dye 626, illumination light of an adequate intensity can be provided to beam splitter 622.

Figure 7:
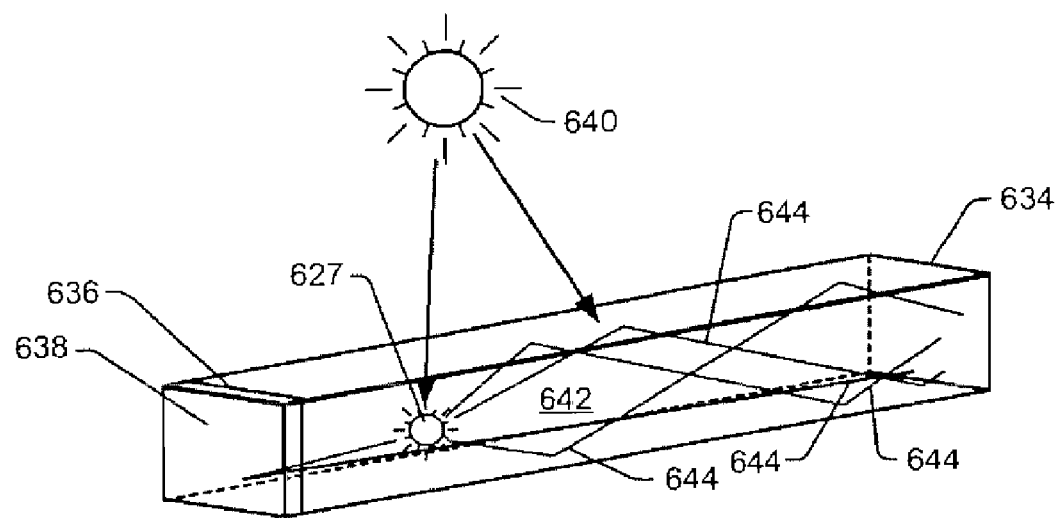
FIG. 7 is an isometric view with a partial cut-away of a first embodiment of the optical waveguide of the display shown in FIG. 6.

FIG. 7 shows a first exemplary embodiment 642 of waveguide 624 shown in FIG. 6. Elements of FIG. 7 that correspond to elements of FIG. 6 are indicated by the same reference numerals and will not be described again in detail. To simplify the drawing, waveguide 642 is shown as a straight waveguide, but the waveguide can have any shape that will fit within the device in which it is used.

An exemplary one of the molecules of light-responsive dye 626 embedded in the core of waveguide 642 is indicated at 627. Molecule 627 of the light-responsive dye absorbs ambient light from ambient light source 640 and, in response to the absorbed light, emits illumination light 644 in any direction. Most of the illumination light 644 is trapped inside the core of waveguide 642 by total internal reflection at the core-cladding boundary. Illumination light 644 emitted towards back end surface 636 is reflected by reflective device 638 towards light-transmissive front end surface 634. To provide more uniform illumination of microdisplay 10, light-transmissive front end surface 634 may optionally be roughened to produce a diffuse source for beam splitter 622.

Figure 8:
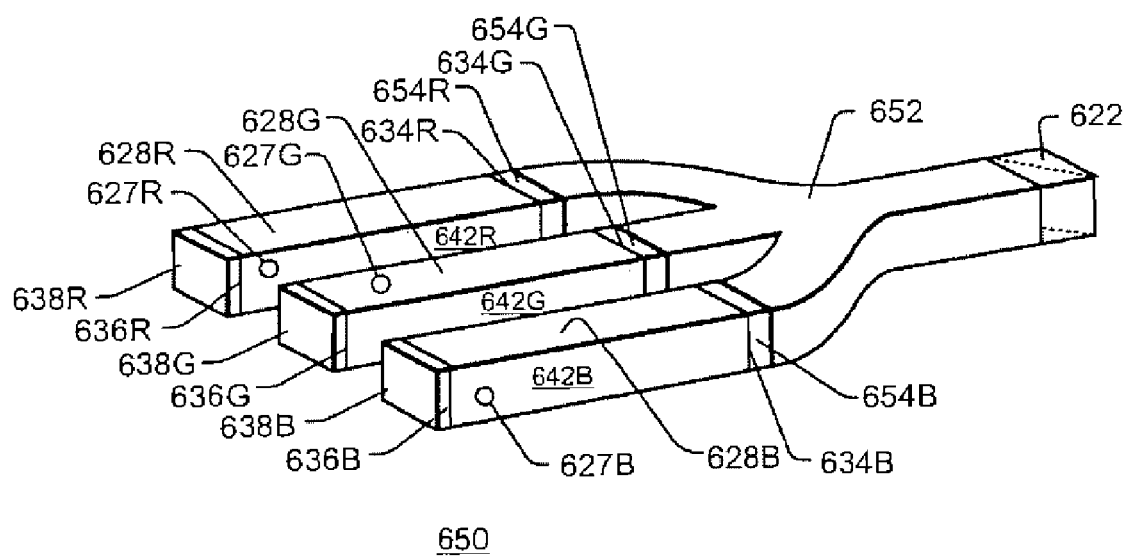
FIG. 8 is an isometric view of a second embodiment of the optical waveguide of the display shown in FIG. 6.

FIG. 8 shows a second exemplary embodiment 650 of waveguide 624 shown in FIG. 6. Elements of FIG. 8 that correspond to elements of FIG. 6 are indicated by the same reference numerals and will not be described again in detail. Waveguide 650 is composed of waveguide components 642R, 642G and 642B and coupler 652. Waveguide component 642R has side surfaces 628R, a light-transmissive front end surface 634R, a back end surface 636R equipped with a reflective device 638R. A light-responsive dye, an exemplary molecule of which is shown at 627R, that emits red light in response to the ambient light is embedded in the core of waveguide component 642R. Waveguide component 612G has side surfaces 628G, a light-transmissive front end surface 634G, a back end surface 636G equipped with a reflective device 638G. A light-responsive dye, an exemplary molecule of which is shown at 627G, that emits green light in response to the ambient light is embedded in the core of waveguide component 642G. Waveguide component 642B has side surfaces 628B, a transmissive front-end surface 634B, a back end surface 636B equipped with a reflective device 638B. A light-responsive dye, an exemplary molecule of which is shown at 627B, that emits blue light in response to the ambient light is embedded in the core of waveguide component 642B.

Waveguide components 642R, 642G and 642B receive ambient light through their respective side surfaces 628R, 628G, and 628B and emit illumination light of red (R), green (G), and blue (B) color, respectively. Waveguide components that emit illumination light of different color combinations having fewer or greater numbers of colors may be used, depending upon the application.

The light-transmissive front end surfaces 634R, 634G, and 634B abut coupler 652. The coupler spatially overlaps the illumination light received from waveguide components 642R, 642G and 642B and outputs the multi-color light to beamsplitter 622. Coupler 652 is a waveguide having a core of an optical material such as glass or plastic and a cladding of a material having a refractive index less than that of the core. Air may be used as the cladding.

FIG. 8 additionally shows optional liquid crystal (LC) shutters 654R, 654G, and 654B interposed between waveguide components 642R, 642G and 642B, respectively, and coupler 652. Optional LC shutters 654R, 654G, and 654B are responsive to electrical signals to allow or prevent the respective transmission of red, green, and blue illumination light into coupler 652. Incorporating the LC shutters provides microdisplay 10 with the option to display sequential color images at the expense of increased power consumption.

To provide the color option, LC shutters 654R, 654G, and 654B are operated sequentially and synchronized to the operation of microdisplay 10. Coupler 652 directs one color of the illumination light, depending on which of the LC shutters is set to transmit light, to beam splitter 622. For example, when the LC shutter 654R is set to transmit light, LC shutters 654G and 654B do not transmit light and red illumination light from waveguide 642R passes to microdisplay 10 through LC shutter 654R, coupler 652 and beamsplitter 622. Green illumination light and blue illumination light are selectively transmitted to the microdisplay in subsequent display periods. To provide a black and white image, all three LC shutters 654R, 654G, and 654B are set to transmit light simultaneously. The shutters may incorporate a ferroelectric layer as described above to reduce their power consumption in this mode.

Figure 9:
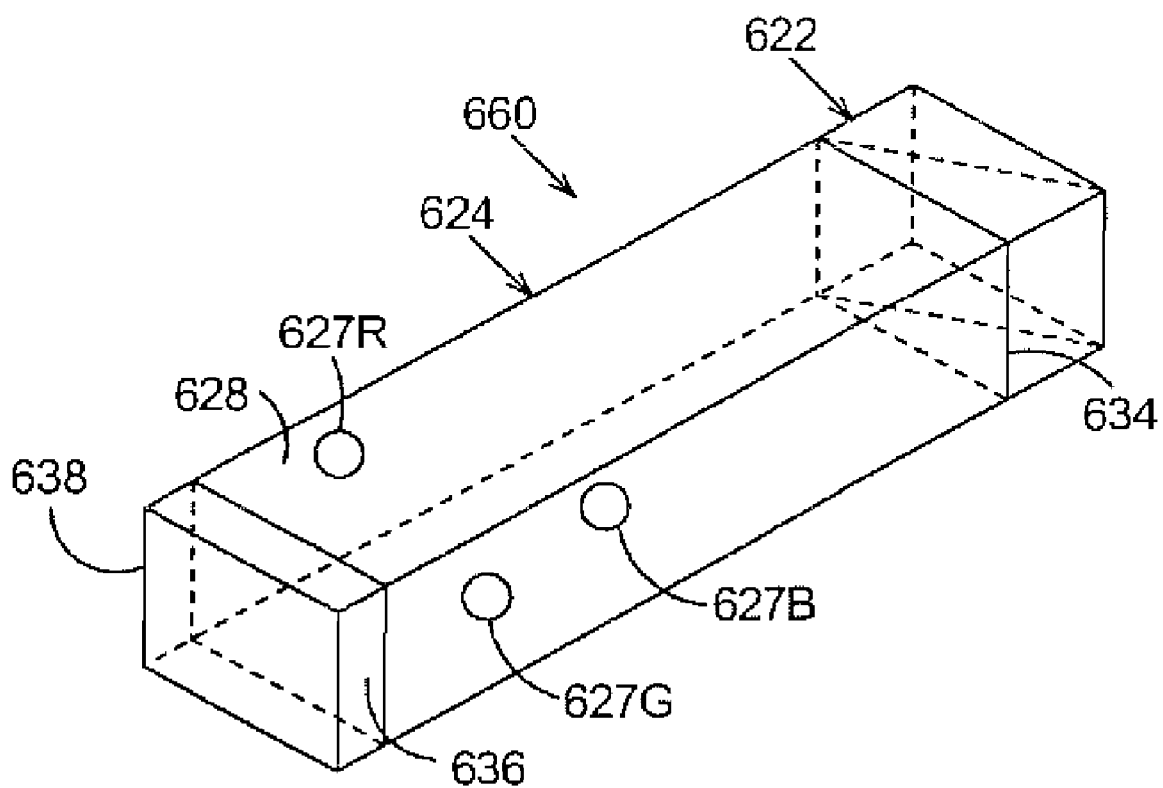
FIG. 9 is an isometric view of a third embodiment of the optical waveguide of the display shown in FIG. 6.

FIG. 9 shows a third exemplary embodiment 660 of waveguide 624 shown in FIG. 6. Elements of FIG. 9 that correspond to elements of FIG. 6 are indicated by the same reference numerals and will not be described again in detail. Light-responsive dyes that emit red, green and blue light are embedded in the core of waveguide 624. An exemplary molecule of the red light-responsive dye is shown at 627R, an exemplary molecule of the green light-responsive dye is shown at 627G, and an exemplary molecule of the blue light-responsive dye is shown at 627B. In this embodiment, light-responsive dye molecules 627R, 627G, and 627B absorb ambient light received via side surfaces 628 and emit illumination light of red, green and blue color, respectively. Waveguide 624 guides the emitted illumination light towards light-transmissive front end surface 634. The illumination light of red, green and blue colors is emitted from light-transmissive front end surface 634 as white illumination light.

The white illumination light generated by waveguide 660 can be used to illuminate an embodiment of microdisplay 10 that displays a color image. The pixels of such embodiment of the microdisplay are equipped with red, green or blue filters to enable the microdisplay to display the color image, as is known in the art. The pixels are also preferably capable of displaying a grey-scale.

The waveguides exemplified in this disclosure have a rectangular cross-section. However, this is not critical: waveguides with other cross-sectional shapes, such as circular or oval, could be substituted.

This disclosure describes the invention in detail using illustrative embodiments. However, it is to be understood that the invention defined by the appended claims is not limited to the precise embodiments described.

We claim:

1. A microdisplay-based display illuminated by ambient light, the display comprising:
   a microdisplay including pixels each comprising a layer of ferroelectric material and a layer of liquid crystal material;
   an optical waveguide physically separated from the microdisplay, the optical waveguide including a light-receiving side surface, a light-transmissive first front end surface, and a back end surface and a reflective device at the back end surface, the optical waveguide including a light-responsive dye embedded therein, the light-responsive dye absorbing the ambient light received through the light-receiving side surface and, in response thereto, emitting illumination light, the optical waveguide guiding the illumination light towards the light-transmissive front end surface; and
   a polarizing beamsplitter physically separated from one or both of the microdisplay and optical waveguide, the polarizing beamsplitter positioned to receive the illumination light from the light-transmissive front end surface of the optical waveguide and to direct a polarization component of the illumination light towards the microdisplay.

2. The microdisplay system of claim 1, in which the light-transmissive front end surface is roughened.

3. The microdisplay system of claim 1, additionally comprising an eyepiece arranged to receive light reflected by the microdisplay after such light has passed through the beam splitter.

4. The microdisplay system of claim 1, wherein the light-responsive dye absorbs ambient light in a first range of wavelengths and, in response to the absorbed light, emits illumination light in a second range of wavelengths, wherein the second range of wavelengths is smaller than the first range of wavelengths.

5. The microdisplay system of claim 1, wherein the polarizing beamsplitter receives the illumination light from the optical waveguide at a first face of the polarizing beamsplitter, wherein the polarizing beamsplitter directs light toward the microdisplay via a second face orthogonal to the first face.

6. The microdisplay system of claim 5, wherein the microdisplay reflects light back towards the polarizing beamsplitter, wherein pixels of the microdisplay selectively rotate or do not rotate the polarization of the reflected light, and wherein light whose polarization has not been rotated by the microdisplay pass through the polarizing beamsplitter.

7. A camera comprising:
   optics;
   an image processing circuit;
   an image sensor, the image sensor configured to send a set of data representing an image to the image processing circuit;
   a microdisplay configured to receive an image signal from the image processing circuit, the image signal representing the set of data representing an image, the microdisplay including a plurality of pixels;
   an optical waveguide physically separated from the microdisplay, the optical waveguide including a light-receiving side surface, a light-transmissive first front end surface, and a back end surface and a reflective device at the back end surface, the optical waveguide including a light-responsive dye embedded therein, the light-responsive dye absorbing the ambient light received through the light-receiving side surface and, in response thereto, emitting illumination light, the optical waveguide guiding the illumination light towards the light-transmissive front end surface; and
   a polarizing beamsplitter physically separated from one or both of the microdisplay and optical waveguide, the polarizing beamsplitter positioned to receive the illumination light from the light-transmissive front end surface of the optical waveguide and to direct a polarization component of the illumination light towards the microdisplay.

8. The camera of claim 7, wherein each of the plurality of pixels comprises a layer of ferroelectric material and a layer of liquid crystal material.

9. A microdisplay, comprising:
   an optical waveguide including a light-receiving side surface, a light-transmissive first front end surface, and a back end surface and a reflective device at the back end surface, the optical waveguide including a light-responsive dye embedded therein, the light-responsive dye absorbing the ambient light received through the light-receiving side surface and, in response thereto, emitting illumination light, the optical waveguide guiding the illumination light towards the light-transmissive front end surface; and
   a polarizing beamsplitter physically separated from the optical waveguide, the polarizing beamsplitter positioned to receive the illumination light from the light-transmissive front end surface of the optical waveguide and to transmit a polarization component of the illumination light away from the polarizing beamsplitter such that the polarization component of the illumination light is reflected and received back at the polarizing beamsplitter which analyzes the reflected light and allows light whose polarization has been rotated to pass through the polarizing beamsplitter.

10. The microdisplay of claim 9, wherein the polarization component of illumination light is reflected by a microdisplay including a plurality of pixels, each of which comprises a layer of ferroelectric material and a layer of liquid crystal material.

* * * * *